United States Patent
Lai et al.

(10) Patent No.: US 10,122,959 B2
(45) Date of Patent: Nov. 6, 2018

(54) DISPLAY CONTROL DEVICE AND METHOD FOR CONTROLLING THE SAME

(71) Applicant: MStar Semiconductor, Inc., Hsinchu, Hsien (TW)

(72) Inventors: Hsin-Cheng Lai, Hsien (TW); Yu-Jen Lai, Hsien (TW); Wen-Yu Chen, Hsien (TW)

(73) Assignee: MSTAR SEMICONDUCTOR, INC., Hsinchu, Hsien (TW)

( * ) Notice: Subject to any disclaimer, the term of this patent is extended or adjusted under 35 U.S.C. 154(b) by 0 days.

(21) Appl. No.: 15/435,559

(22) Filed: Feb. 17, 2017

(65) Prior Publication Data

US 2018/0054593 A1    Feb. 22, 2018

(30) Foreign Application Priority Data

Aug. 16, 2016 (TW) .............................. 105126148 A

(51) Int. Cl.
| | |
|---|---|
| *H04N 7/01* | (2006.01) |
| *H04N 5/04* | (2006.01) |
| *G09G 5/00* | (2006.01) |

(52) U.S. Cl.
CPC ............. *H04N 7/0127* (2013.01); *G09G 5/00* (2013.01); *H04N 5/04* (2013.01)

(58) Field of Classification Search
CPC .................................. H04N 7/56; H04N 5/04
USPC ........ 348/513, 500, 505, 516, 521–524, 517
See application file for complete search history.

(56) References Cited

U.S. PATENT DOCUMENTS

| | | | | |
|---|---|---|---|---|
| 4,445,135 A | * | 4/1984 | Heitmann | H04N 5/0736 348/506 |
| 4,912,549 A | * | 3/1990 | Altman | H04N 7/015 348/473 |
| 5,329,366 A | * | 7/1994 | Kuroda | H04N 5/956 348/512 |
| 5,465,076 A | * | 11/1995 | Yamauchi | H03K 3/0315 327/277 |
| 8,072,539 B1 | * | 12/2011 | Cooper | H04N 9/475 348/441 |
| 9,147,375 B2 | * | 9/2015 | Chen | G09G 5/005 |
| 2003/0081147 A1 | * | 5/2003 | Zimmermann | H04L 7/0083 348/500 |
| 2012/0026156 A1 | * | 2/2012 | Chen | G09G 5/005 345/214 |
| 2012/0056745 A1 | * | 3/2012 | Noguchi | G08B 21/24 340/573.1 |

(Continued)

FOREIGN PATENT DOCUMENTS

TW    200842820 A    11/2008

*Primary Examiner* — Paulos M Natnael
(74) *Attorney, Agent, or Firm* — Edell, Shapiro & Finnan, LLC

(57) ABSTRACT

A display control device includes a detector, a frequency adjusting signal generator, a clock generator and an output timing generator. The detector compares an input field reference signal with an output field reference signal to determine a time difference signal. The frequency adjusting signal generator outputs a frequency adjusting signal. The clock generator outputs a clock according to the frequency adjusting signal. The output timing generator generates an output field synchronization signal according to the clock. The clock generator adjusts the frequency of the clock according to the frequency adjusting signal.

9 Claims, 9 Drawing Sheets

(56) References Cited

U.S. PATENT DOCUMENTS

2015/0270936 A1* 9/2015 Han ............... H04L 5/0048
370/329
2017/0366191 A1* 12/2017 Wang ............... H03L 7/091

* cited by examiner

DISPLAY CONTROL DEVICE AND METHOD FOR CONTROLLING THE SAME

This application claims the benefit of Taiwan application Serial No. 105126148, filed Aug. 16, 2016, the subject matter of which is incorporated herein by reference.

BACKGROUND OF THE INVENTION

Field of the Invention

The invention relates in general to a semiconductor device, and more particularly to a display controller.

Description of the Related Art

Displaying video means displaying multiple frames within a period on a display device. The display device usually needs to accept various sources of video, with however these sources of video having different frame rates and resolutions. If an input frame rate is higher than an output frame rate, a buffer capacity of a controller of the display device may be insufficient in a way that previous frame data may be overwritten. On the other hand, if an output frame rate is greater than the input frame rate, some frame data may be repeatedly outputted, hence causing erroneous or unsmooth frames. Therefore, a display device needs a display controller that solves the issues of different input and output frame rates as well as different resolutions in order to smoothly display frames on the display device.

SUMMARY OF THE INVENTION

The invention is directed to a display control device that automatically adjusts an output frame rate to synchronize input and output frame rates.

The present invention is further directed to a display control device that shortens the time needed for synchronizing input frame and output frames.

According to an embodiment of the present invention, a control device for controlling frame synchronization is provided. The display control includes a detector, a frequency adjusting signal generator, a clock generator and an output timing generator. The detector receives an input field reference signal and an output field reference signal. The detector compares the input field reference signal with the output field reference signal to determine a time difference signal. The time difference signal represents a time difference between the input field reference signal and the output field reference signal. The frequency adjusting signal generator receives the time difference signal, and outputs a frequency adjusting signal according to the time difference signal. The clock generator outputs a clock according to the frequency adjusting signal. The output timing generator receives the clock, and generates an output field synchronization signal and an output line synchronization signal according to the clock. A frequency of the output field synchronization signal is directly proportional to a frequency of the output reference signal. The clock generator adjusts the frequency of the clock according to the frequency adjusting signal, such that the time difference is reduced to be lower than a predetermined difference.

According to another embodiment of the present invention, a method for controlling frame synchronization is provided. A time difference between an input field reference signal and an output field reference signal is determined. It is determined whether the input field reference signal and the output field reference signal are ahead or behind. When the output field reference signal is behind relative to the input field reference signal, a frequency of a clock is increased. When the output field reference signal is ahead relative to the input field reference signal, the frequency of the clock is decreased. It is checked whether the time difference is lower than a predetermined difference.

According to another embodiment of the present invention, a control device for controlling frame synchronization is provided. The control device includes a detector, a frequency adjusting signal generator, a clock generator and an output timing generator. The detector receives an input field reference signal and an output field reference signal. The detector compares the input field reference signal with the output field reference signal to determine a time difference signal. The time difference represents a time difference between the input field reference signal and the output field reference signal.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
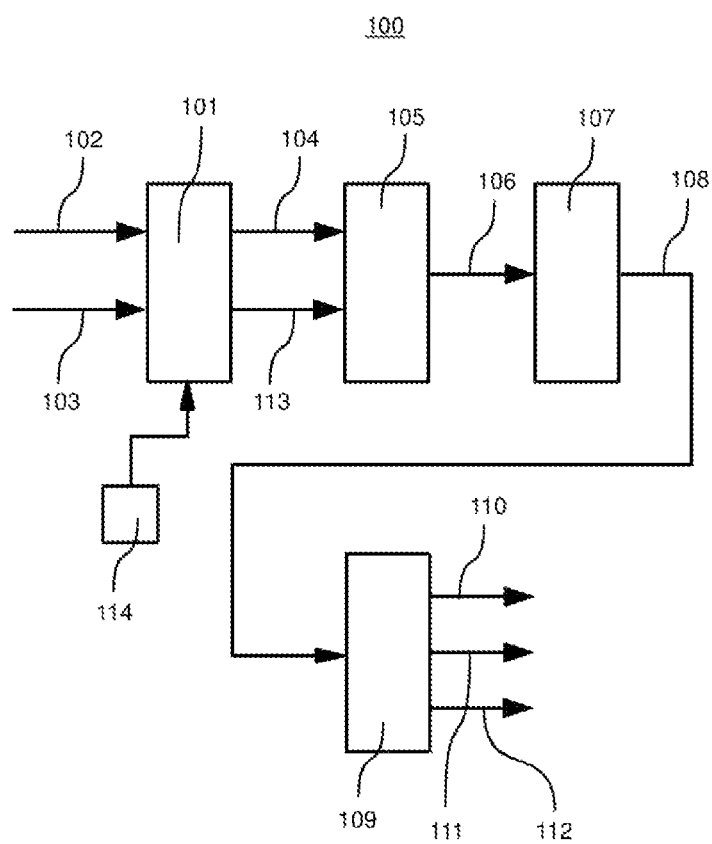
FIG. 1 shows a control device according to an embodiment of the present invention.

A control device 100 for controlling frame synchronization is provided according to an embodiment of the present invention. Referring to FIG. 1, the control device 100 includes a detector 101, a frequency adjusting signal generator 105, a clock generator 107 and an output timing generator 109. The detector 101 receives an input field reference signal 102 and an output field reference signal 103. The detector 103 compares the input field reference signal 102 with the output field reference signal 103 to determine an ahead/behind signal 113. The ahead/behind signal 113 indicates whether the output field reference signal 103 is ahead or behind relative to the input field reference signal 102. The frequency adjusting signal generator 105 receives the ahead/behind signal 113, and outputs a frequency adjusting signal 106 according to the ahead/behind signal 113. The clock generator 107 outputs a clock 108 according to the frequency adjusting signal 106.

In one embodiment, the detector 101 compares the input field reference signal 102 with the output field reference signal 103 to determine a time difference signal 104, which represents a time difference between the input field reference signal 102 and the output field reference signal 103. The frequency adjusting signal generator 105 further receives the time difference signal 104, and outputs the frequency adjusting signal 106 according to the ahead/behind signal 113 and the time difference signal 104.

The output timing generator 109 receives the clock 108, and generates an output field synchronization signal 110, an output line synchronization signal 111 and an output data enabling signal 112 according to the clock 108. In one embodiment, the output field synchronization signal 110 is fed back to serve as the output field reference signal 103. In one embodiment, the frequency of the output field reference signal 103 is directly proportional to the frequency of the output field synchronization signal 110. The clock generator 107 adjusts the frequency of the clock 108 according to the frequency adjusting signal 106, such that the time difference is reduced to be lower than a predetermined threshold. The output field synchronization signal 110 and the output line synchronization signal 111 are also known as vertical synchronization (VSync) and horizontal synchronization (HSync) signals, respectively.

Figure 4:
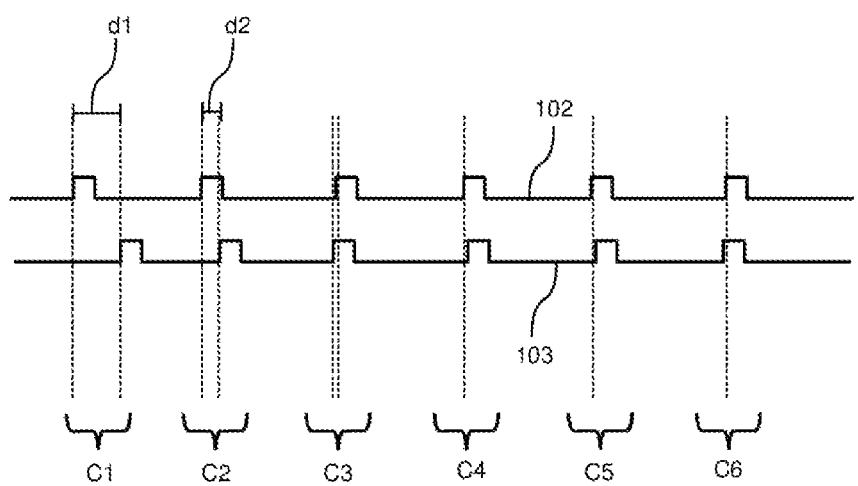
FIG. 4 is a waveform diagram of an input field reference signal and an output field reference signal.

Referring to FIG. 4, in a $1^{st}$ round of comparison C1, the output field reference signal 103 is behind the input field reference signal 102 by a time difference d1, and so the control device 100 increases the clock 108 to increase the frequency of the output field reference signal 103. In a $2^{nd}$ round of comparison C2, the output field reference signal 103 is still behind the input field reference signal 102, with however the time difference of falling behind reduced to d2, and so the control device 100 continues increasing the clock 108. In a $3^{rd}$ round of comparison C3, the output field reference signal 103 is ahead of the input field reference signal 102, and so the control device 100 reduces the clock 108.

In each round of comparison, the control device 100 checks whether the time difference is lower than a predetermined difference. Given that the time difference is lower than a predetermined threshold for a predetermined number of consecutive output frames, frame synchronization is deemed achieved. Referring to FIG. 4, in this embodiment, the time difference in a $4^{th}$ round of comparison is smaller than the predetermined difference, and is persistently smaller than the predetermined difference in following $5^{th}$ and $6^{th}$ rounds of comparison C5 and C6. When it is set that synchronization is completed given that the time difference is smaller than the predetermined difference for 3 consecutive frames, this embodiment means that frame synchronization is achieved after the $4^{th}$, $5^{th}$ and $6^{th}$ rounds of comparison C4, C5 and C6.

In one embodiment, if an input field synchronization signal 203 has a frequency close to that of the output field synchronization signal 110, the detector 101 may directly compare the input field synchronization signal 203 with the output field synchronization signal 110. In one embedment, if the difference between the frequencies of the input field synchronization signal 203 and the output field synchronization signal 110 is large, the input field synchronization signal 203 is converted to the input field reference signal 102, the output field synchronization signal 110 is converted to the output field reference signal 103, and the detector 101 may then compare the input field reference signal 102 and the output field reference signal 103 to accelerate the speed of frame synchronization. Details for accelerating the speed of frame synchronization are given below.

In one embodiment, the detector 101 outputs the ahead/behind signal 113, which indicates whether the output field reference signal 103 is ahead of behind relative to the input field reference signal 102. The frequency adjusting signal generator 105 receives the ahead/behind signal 113. In one embodiment, when the output field reference signal 103 is behind relative to the input field reference signal 102, the clock generator 107 increases the frequency of the clock 108; when the output field reference signal 103 is ahead relative to the input field reference signal 102, the clock generator 107 decreases the frequency of the clock 108.

In one embodiment, the frequency adjusting signal generator 105 is a proportional-integral (PI) controller. In another embodiment, the frequency adjusting signal generator 106 is proportional-integral-derivative (PID) controller. In one embodiment, the output field reference signal 103 obtains the same relative position of each of the output frames. In one embodiment, coefficients of a proportional term, an integral term and a derivative term in the PI controller or PID controller may be adjusted.

In one embodiment, the clock generator 107 adjusts the frequency of the clock 108 according to the frequency adjusting signal 106, such that the time difference signal 104 is lower than a predetermined difference for a predetermined number of consecutive output frames. In one embodiment, the control device 100 further includes a quartz oscillator 114, and the time difference signal 104 represents the number of oscillations of the quartz oscillator 114 in the time difference between the output field reference signal 103 and the input field reference signal 102.

Figure 2:
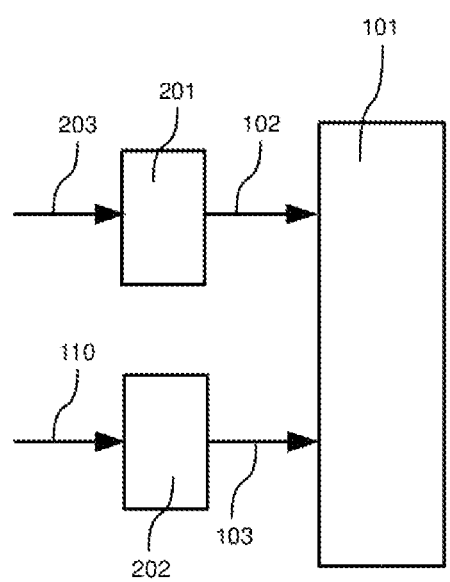
FIG. 2 shows a pre-processing method for a signal inputted into a detector.

Referring to FIG. 2, in one embodiment, the control device 100 further includes a first frequency divider 201 and a second frequency divider 202. The first frequency divider 201 receives the input field synchronization signal 203, and divides the input field synchronization signal 203 by a first value to generate the input field reference signal 102. The second frequency divider 202 receives the output field synchronization signal 110, and divides the output field synchronization signal 110 by a second value to generate the output field reference signal 103. As such, the input field reference signal 102 and the output field reference signal 103 may have substantially the same frequency.

Figure 5:
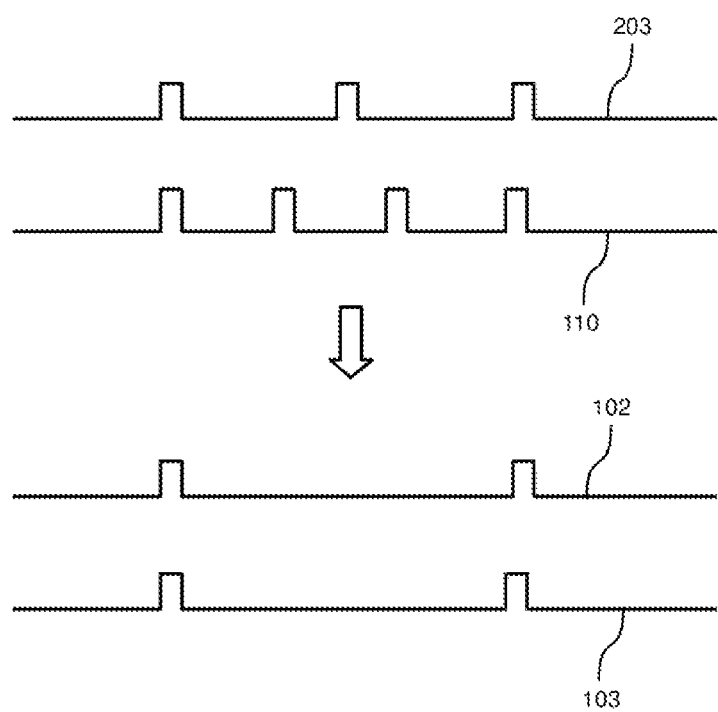
FIG. 5 is a waveform diagram of a signal inputted into a detector before and after pre-processing.

Referring to FIG. 5, in this embodiment, because the frame rates of the input field synchronization signal 203 and the output field synchronization signal 110 are different, the two may be respectively divided to obtain closer frame rates and then sent to the detector 101 for comparison. Thus, frame synchronization may also be achieved for input and output frame rates in different frequencies. For example, the input field synchronization signal 203 is frequency divided to become the input field reference signal 102, and the output field synchronization signal 110 is frequency divided to become the output field reference signal 103. As such, the input field reference signal 102 and the output field reference signal 103 obtained after frequency dividing have closer frame rates or frequencies, which is beneficial for frame synchronization.

In one embodiment, the input field reference signal 102 is equal to the input field synchronization signal 203, and the control device 100 may further include a second frequency divider 202. The second frequency divider 202 divides the output field synchronization signal 110 by a second value to generate the output field reference signal 103, such that the input field reference signal 102 and the output field reference signal 103 have substantially the same frequency.

Figure 3:
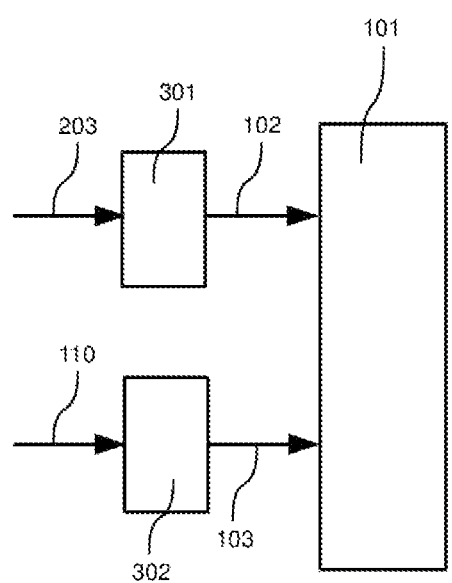
FIG. 3 shows another pre-processing method for a signal inputted into a detector.
Figure 6:
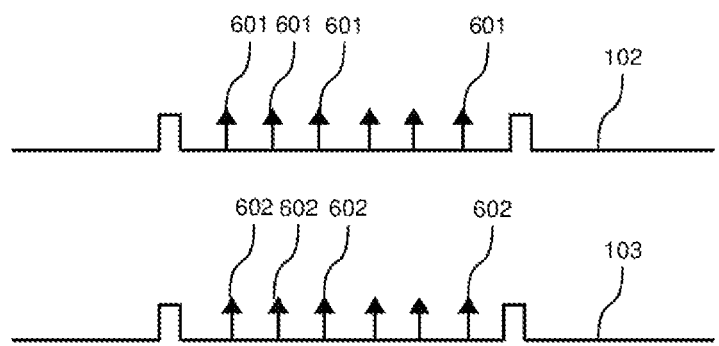
FIG. 6 is a waveform diagram of a signal inputted into a detector after pre-processing.

Referring to FIG. 3 and FIG. 6, in one embodiment, the control device 100 further includes a first pulse signal generator 301 and a second pulse signal generator 302. The first pulse signal generator 301 receives the input field synchronization signal 203, and adds a plurality of first pulses 601 to the input field synchronization signal 203 to generate the input field reference signal 102. The second pulse signal generator 302 receives the output field synchronization signal 110, and adds a plurality of second pulses to the output field synchronization signal 110 to generate the output reference signal 103.

Figure 7:
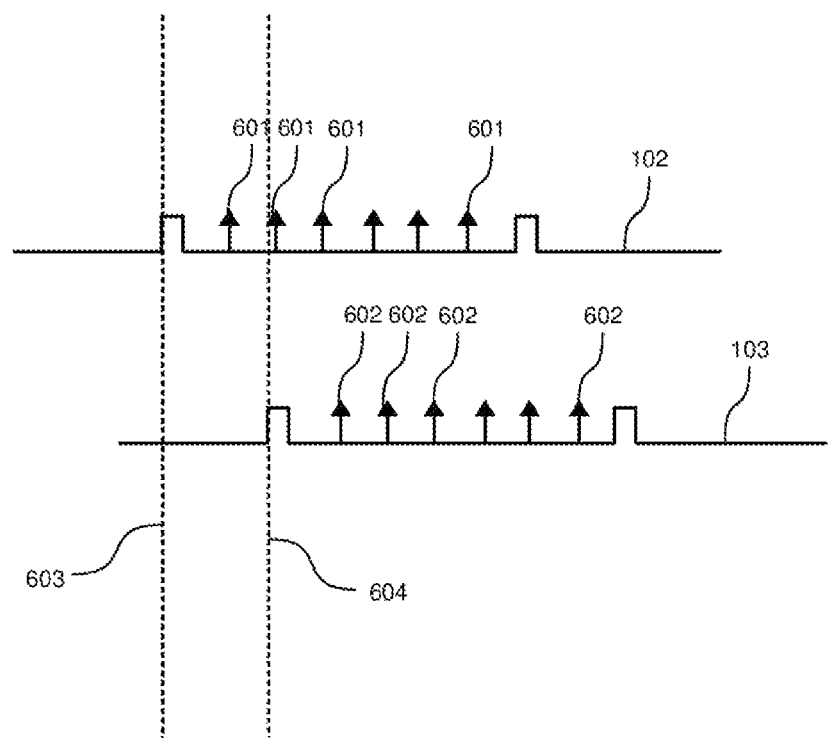
FIG. 7 is a waveform diagram of a signal inputted into a detector.

The first pulse generator 301 generates the first pulses 601 by counting according to an input clock, and the second pulse generator 302 generates the second pulses 602 by counting according to an output clock. In one embodiment, the output clock is the clock 108. When the ratio between the numbers of the first pulses 601 and the second pulses 602 is equal to the ratio between the original input field reference signal 102 and output field reference signal 103, an effect of frame synchronization is achieved. In other words, when a time difference between two adjacent first pulses 601 is equal to a time difference between two adjacent second pulses 602, the relative relationship between the first pulses 601 and the second pulses 602 may be used for synchronization. Referring to FIG. 7, the above method provides a faster speed for frame synchronization, with however a time difference between an input frame and an output frame being variant for each round of synchronization, e.g., the synchronization may occur at a time point 604. In the above situation, the control device 100 needs a sufficient storage space for storing the data between the time point 603 to the time point 604.

For example, assume that the input frame rate is 60 Hz, a horizontal pixel count (Htt) is 2200, a vertical pixel count (Vtt) is 1125, and an input clock is used for counting. As such, for every second, there are Htt*Vtt*frame_rate=148,500,000 input cock cycles. Assuming that the output frame rate is 120 Hz, a horizontal pixel count (Htt) is 4400, a vertical pixel count (Vtt) is 2250, and an output clock is used for count. As such, for every second, there are Htt*Vtt*frame_rate=1,188,000,000 output clock cycles. Thus, the ratio between the numbers of input clock cycles and output clock cycles per second is: 148,500,000:1,188,000,000=1:8. Therefore, if the ratio between the number of pulses generated according to the input clock count and the number of pulses generated according to the output clock count is 1:8, and these newly generated pulses are used to replace the original output field synchronization signal and input field synchronization signal 203, the speed of locking may be accelerated.

A method for controlling frame synchronization is further provided according to an embodiment of the present invention. The method includes following steps. In step S801, a time difference or an ahead/behind state of an input field reference signal and an output field reference signal is determined. In step S802, it is determined to increase or decrease a frequency of a clock according to the ahead/behind state. In one embodiment, step S802 further includes increasing the frequency of the clock when the output field reference signal is in a behind state relative to the input field reference signal, and decreasing the frequency of the clock when the output field reference signal is in an ahead state relative to the input field reference signal. In step S803, it is checked whether the time difference is reduced to be lower than a predetermined difference for a predetermined number of consecutive output frames.

If a check result indicates that the time difference is lower than the predetermined difference for the predetermined number of consecutive output frames, it means that frame synchronization is completed (step S804). After this round of frame synchronization is completed, step S801 is iterated to continue performing the same detection and adjustment on subsequent frames. If the check result indicates that the time difference is not persistently lower than the predetermined difference for the predetermined number of output frames, it means that frame synchronization is not completed, and so step S801 is also iterated to perform the same detection and adjustment on subsequent frames.

Figure 8:
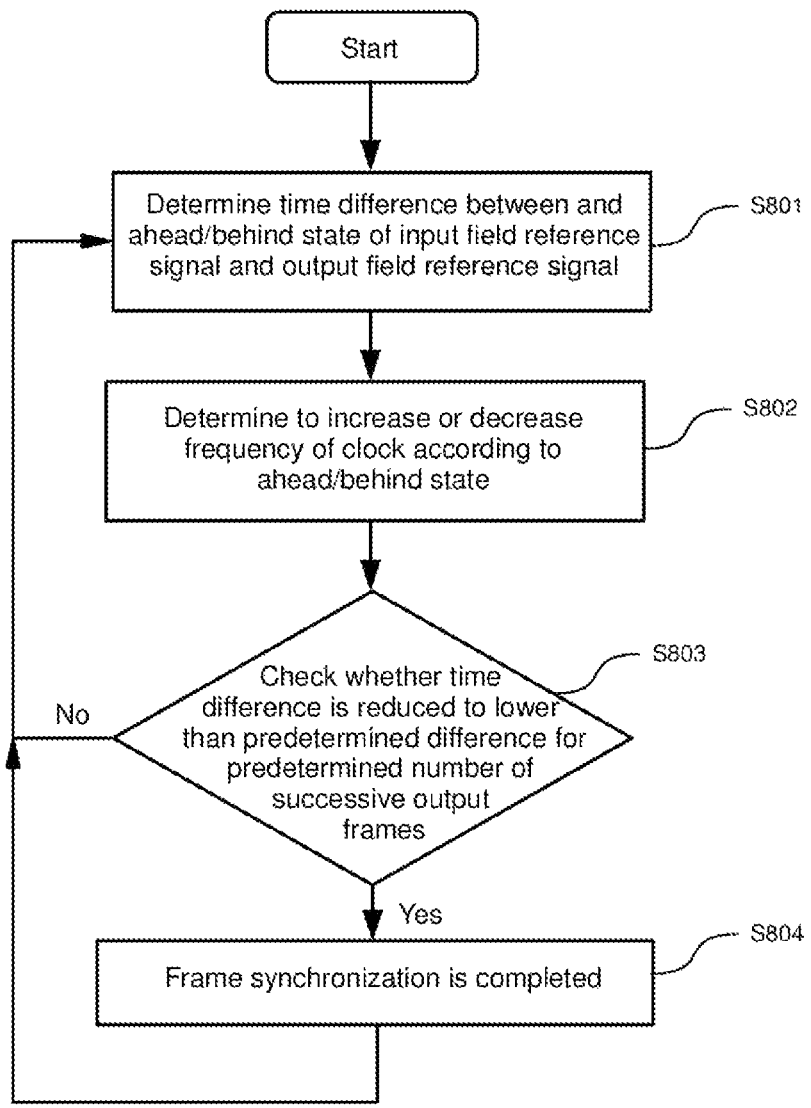
FIG. 8 is a flowchart of a method for controlling frame synchronization.
Figure 9:
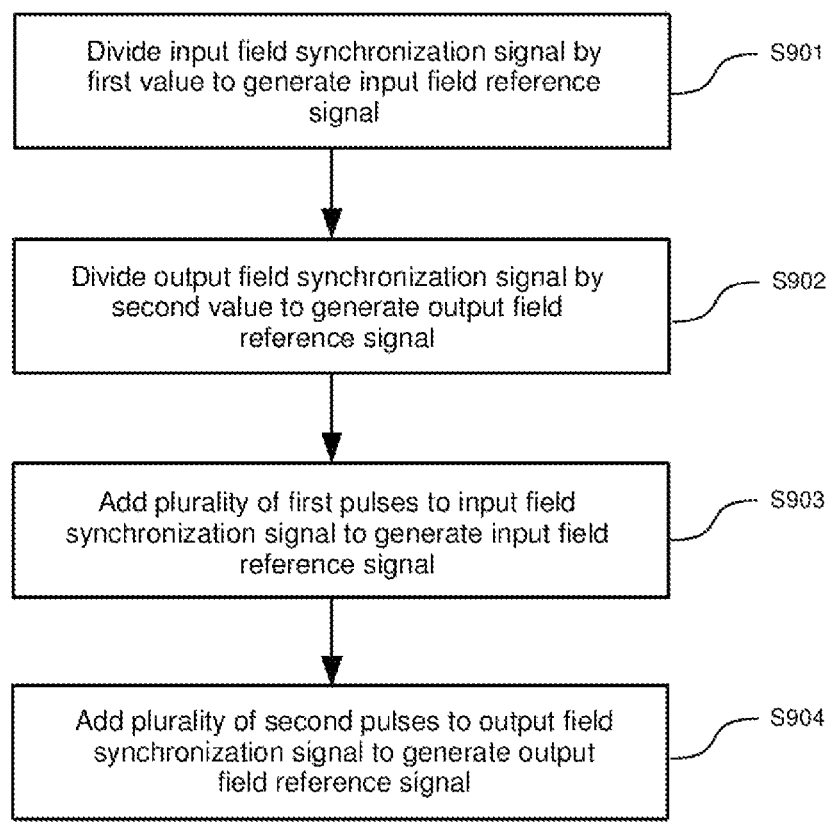
FIG. 9 shows more steps of a method for controlling frame synchronization.

Referring to FIG. 9, in one embodiment, the method further includes step S901 of dividing an input field synchronization signal by a first value to generate the input field reference signal. In one embodiment, the method further includes step S902 of dividing an output field synchronization signal by a second value to generate the output field reference signal. In one embodiment, the method further includes step S903 of adding a plurality of first pulses to the input field synchronization signal to generate the input field reference signal. In one embodiment, the method further includes step S904 of adding a plurality of second pulses to the output field synchronization signal to generate the output field reference signal. In one embodiment, the method further includes calculating the number of oscillations in the time difference between the output field reference signal and the input field reference signal by using a quartz oscillator. The steps in FIG. 8 and FIG. 9 may be exchanged instead of being performed in a fixed order, given that similar or the same effect is achieved.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A control device, for controlling frame synchronization, comprising:
    a detector, receiving an input field reference signal and an output field reference signal, comparing the input field reference signal with the output field reference signal to determine an ahead/behind signal that indicates whether the output field reference signal is ahead or behind relative to the input field reference signal;
    a frequency adjusting signal generator, receiving the ahead/behind signal, and outputting a frequency adjusting signal according to the ahead/behind signal;
    a clock generator, outputting a clock according to the frequency adjusting signal; and
    an output timing generator, receiving the clock, and outputting an output field synchronization signal and an output line synchronization signal according to the clock,
    wherein a frequency of the output field reference signal is directly proportional to a frequency of the output field synchronization signal, and the clock generator adjusts a frequency of the clock according to the frequency adjusting signal, and the detector further outputs a time difference signal, which is directly proportional to a time difference between the input field reference signal and the output field reference signal, and the frequency adjusting signal generator receives the time difference signal,
    the control device further comprising a first frequency divider and a second frequency divider; wherein, the first frequency divider receives an input field synchronization signal, and divides the input field synchronization signal by a first value to generate the input field reference signal, the second frequency divider receives the output field synchronization signal, and divides the output field synchronization signal by a second value to generate the output field reference signal, such that the input field reference signal and the output field reference signal have a substantially same frequency.

2. The control device according to claim 1, wherein the frequency adjusting signal generator is a proportional-integral controller.

3. The control device according to claim 1, wherein the frequency adjusting signal generator is a proportional-integral-derivative controller.

4. The control device according to claim 1, wherein the output field reference signal is obtained from a same relative position of each output frame.

5. The control device according to claim 1, wherein the clock generator increases the frequency of the clock when the output field reference signal is behind relative to the input field reference signal, and decreases the frequency of the clock when the output field reference signal is ahead relative to the input field reference signal.

6. The control device according to claim 1, wherein the clock generator adjusts the frequency of the clock, such that a representative value of the time difference signal is reduced to be lower than a predetermined difference for a predetermined number of consecutive output frames.

7. The control device according to claim 1, further comprising a quartz oscillator, wherein the time difference signal is the number of oscillations in a time difference between the output field reference signal and the input field reference signal.

8. A control device, for controlling frame synchronization, comprising:
   a detector, receiving an input field reference signal and an output field reference signal, comparing the input field reference signal with the output field reference signal to determine an ahead/behind signal that indicates whether the output field reference signal is ahead or behind relative to the input field reference signal;
   a frequency adjusting signal generator, receiving the ahead/behind signal, and outputting a frequency adjusting signal according to the ahead/behind signal;
   a clock generator, outputting a clock according to the frequency adjusting signal; and
   an output timing generator, receiving the clock, and outputting an output field synchronization signal and an output line synchronization signal according to the clock,
   wherein a frequency of the output field reference signal is directly proportional to a frequency of the output field synchronization signal, and the clock generator adjusts a frequency of the clock according to the frequency adjusting signal, and the detector further outputs a time difference signal, which is directly proportional to a time difference between the input field reference signal and the output field reference signal, and the frequency adjusting signal generator receives the time difference signal,
   wherein the input field reference signal is equal to the input field synchronization signal, the control device further comprises a second frequency divider, and the second frequency divider divides the output field synchronization signal by a second value to generate the output field reference signal, such that the input field reference signal and the field output reference signal have a substantially same frequency.

9. A control device, for controlling frame synchronization, comprising:
   a detector, receiving an input field reference signal and an output field reference signal, comparing the input field reference signal with the output field reference signal to determine an ahead/behind signal that indicates whether the output field reference signal is ahead or behind relative to the input field reference signal;
   a frequency adjusting signal generator, receiving the ahead/behind signal, and outputting a frequency adjusting signal according to the ahead/behind signal;
   a clock generator, outputting a clock according to the frequency adjusting signal; and
   an output timing generator, receiving the clock, and outputting an output field synchronization signal and an output line synchronization signal according to the clock,
   wherein a frequency of the output field reference signal is directly proportional to a frequency of the output field synchronization signal, and the clock generator adjusts a frequency of the clock according to the frequency adjusting signal, and the detector further outputs a time difference signal, which is directly proportional to a time difference between the input field reference signal and the output field reference signal, and the frequency adjusting signal generator receives the time difference signal,
   the control device further comprising a first pulse signal generator and a second pulse signal generator; wherein, the first pulse signal generator receives an input field synchronization signal, and adds a plurality of first pulses to the input field synchronization signal to generate the input field reference signal, and the second pulse signal generator receives the output field synchronization signal, and adds a plurality of second pulses to the output field synchronization signal to generate the output field reference signal.

* * * * *